(12) United States Patent
Bauman et al.

(10) Patent No.: US 7,289,830 B2
(45) Date of Patent: Oct. 30, 2007

(54) SYSTEM AND METHOD FOR VEHICLE MODULE WAKE UP IN RESPONSE TO COMMUNICATION ACTIVITY

(75) Inventors: Jason G. Bauman, Huntington Woods, MI (US); Kenan R. Rudnick, Bloomfield Hills, MI (US); Jody K. Harwood, Canton, MI (US)

(73) Assignee: Lear Corporation, Southfield, MI (US)

( * ) Notice: Subject to any disclaimer, the term of this patent is extended or adjusted under 35 U.S.C. 154(b) by 407 days.

(21) Appl. No.: 10/907,068

(22) Filed: Mar. 18, 2005

(65) Prior Publication Data

US 2006/0211400 A1    Sep. 21, 2006

(51) Int. Cl.
*H04M 1/00* (2006.01)
*H04B 1/06* (2006.01)
*H04B 1/16* (2006.01)

(52) U.S. Cl. ............... 455/569.2; 455/67.11; 455/575.9; 455/345; 455/9; 455/99

(58) Field of Classification Search ............. 455/569.2, 455/575.9, 420, 343.1, 343.3, 343.4, 344–345, 455/401, 9, 522, 67.11, 556.1, 557, 525.1, 455/99, 346–347
See application file for complete search history.

(56) References Cited

U.S. PATENT DOCUMENTS

| | | | |
|---|---|---|---|
| 5,075,638 A | | 12/1991 | Babin et al. |
| 6,915,126 B2 * | | 7/2005 | Mazzara, Jr. ............... 455/411 |
| 6,947,732 B2 * | | 9/2005 | Fraser ......................... 455/420 |
| 6,968,176 B2 * | | 11/2005 | Juzswik ....................... 455/411 |
| 6,973,476 B1 * | | 12/2005 | Naden et al. ............... 709/203 |
| 6,993,351 B2 * | | 1/2006 | Fraser et al. ................. 455/466 |
| 7,006,845 B2 * | | 2/2006 | Simon ....................... 455/553.1 |
| 7,027,808 B2 * | | 4/2006 | Wesby ......................... 455/419 |
| 7,130,633 B2 * | | 10/2006 | Kamdar et al. ............. 455/445 |
| 7,142,810 B2 * | | 11/2006 | Oesterling ....................... 455/9 |
| 7,209,771 B2 * | | 4/2007 | Twitchell, Jr. .............. 455/574 |
| 7,224,980 B2 * | | 5/2007 | Hara ........................ 455/456.1 |
| 7,233,792 B2 * | | 6/2007 | Chang ...................... 455/422.1 |

FOREIGN PATENT DOCUMENTS

WO    WO2005/020522 A1    3/2005
WO    WO2005/094464 A3    10/2005

* cited by examiner

*Primary Examiner*—Pablo N. Tran
(74) *Attorney, Agent, or Firm*—Brooks Kushman P.C.

(57) ABSTRACT

A method for establishing communication between a communication protocol controller and a main controller including the steps of monitoring a communication bus using a power management device wherein the bus is electrically coupled to the protocol controller, the power management device, and the main controller residing in an initial low power mode, determining when the protocol controller is attempting to communicate with the main controller, generating a wake-up signal in response to the attempted communication, presenting the wake-up signal to the processor of the main controller, wherein the main controller enters a wake-up mode in response to the wake-up signal, reading at least one communication protocol configuration parameter from the data storage device, and initiating communication between the main controller and the protocol controller using the at least one communication protocol configuration parameter such that communication between the protocol controller and a communication protocol enabled device is maintained.

20 Claims, 3 Drawing Sheets

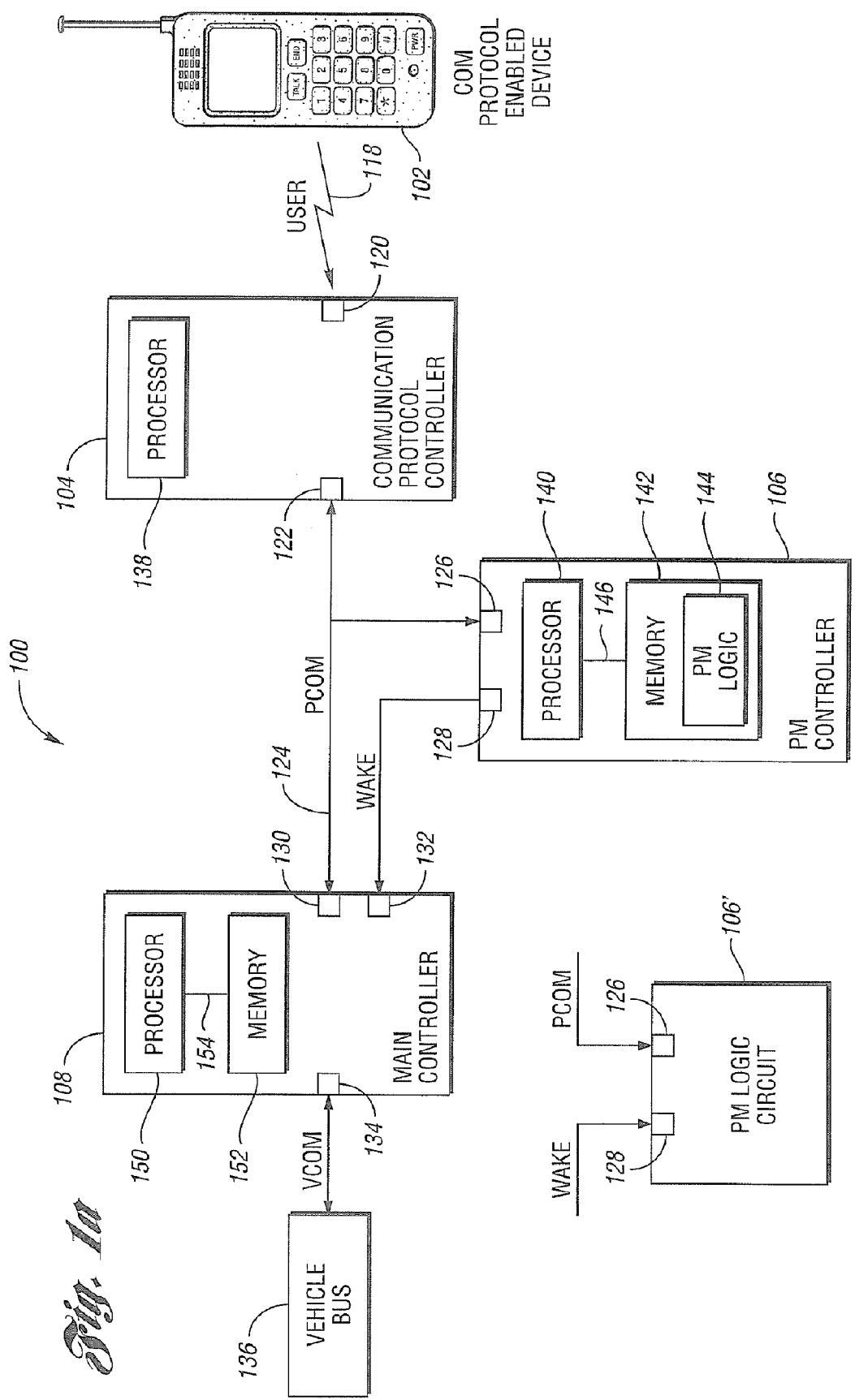

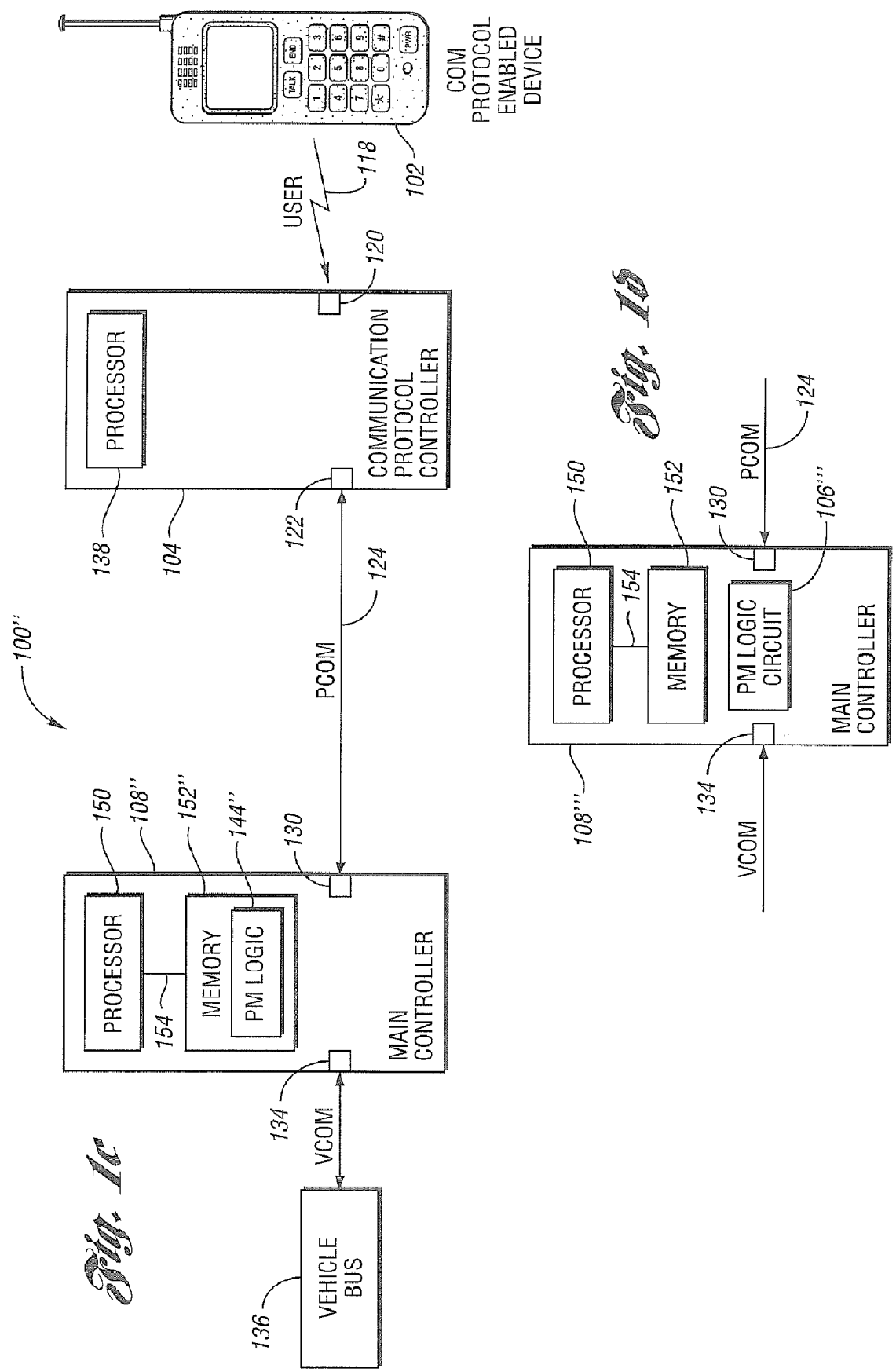

SYSTEM AND METHOD FOR VEHICLE MODULE WAKE UP IN RESPONSE TO COMMUNICATION ACTIVITY

BACKGROUND OF THE INVENTION

1. Field of the Invention

This invention relates to a system and method for waking up a vehicle module in response to communication activity.

2. Background Art

Communication protocol controllers generally act as an interface between a communication protocol enabled device and a main controller. However, a main controller may be required to initialize and synchronize with the communication protocol controller before communication between the main controller and the communication protocol enabled device is supported. The initialization/synchronization process generally ensures that the control parameters of each controller are in agreement such that communication between the controllers is properly enabled. A conventional initialization/synchronization process may, however, cause the communication protocol controller to lose pre-existing communication links with communication protocol enabled devices.

The synchronization requirement has been particularly problematic when attempting to interface motor vehicle controllers with Bluetooth enabled devices. In conventional approaches, the main controller of a motor vehicle is kept in a deep sleep mode (i.e., a low power state) when the vehicle is not in operation. Putting the main controller into a deep sleep has the advantage of minimizing the main controller power consumption such that the vehicle battery charge may be maintained at an acceptable level. However, in the deep sleep state the main controller is unable to communicate with the Bluetooth controller. As such, the conventional main controller must initialize and synchronize with the Bluetooth controller upon power up (i.e., when the main controller exits the deep sleep mode and returns to an operational state). In conventional approaches, the initialization/synchronization process causes the Bluetooth controller to lose all prior established communication links with Bluetooth enabled devices. The loss of the pre-existing communication links is generally undesirable.

Thus, it would be desirable to have a system and method for enabling communication between a main controller and a communication protocol controller that overcomes the deficiencies of conventional approaches.

SUMMARY OF THE INVENTION

Accordingly, the present invention provides a system and method for establishing communication between a communication protocol controller and a main controller such that pre-existing communication links between the communication protocol controller and communication protocol enabled devices are maintained.

According to the present invention, a method for establishing communication between a communication protocol controller and a main controller is provided. The method comprises monitoring a communication bus using a power management device wherein the communication bus is electrically coupled to a communication protocol controller, the power management device, and a main controller residing in an initial low power mode and having a processor and a data storage device. The method further comprises determining when the communication protocol controller is attempting to communicate with the main controller, generating a wake-up signal in response to the attempted communication, presenting the wake-up signal to the processor of the main controller, wherein the main controller enters a wake-up mode in response to the wake-up signal, reading at least one communication protocol configuration parameter from the data storage device, wherein the at least one configuration parameter is read by the main controller in response to the wake-up signal, and initiating communication between the main controller and the communication protocol controller using the at least one communication protocol configuration parameter such that communication between the communication protocol controller and a communication protocol enabled device is maintained.

Also according to the present invention, a system for establishing communication between a communication protocol controller and a main controller is provided. The system comprises a communication protocol controller electrically coupled to a communication bus, a main controller electrically coupled to the communication bus and having a processor and a data storage device including at least one communication protocol configuration parameter, wherein the main controller is in an initial low power mode, and a power management device electrically coupled to the communication bus. The power management device monitors the communication bus, determines when the communication protocol controller is attempting communication with the main controller, generates a wake-up signal in response to the attempted communication, and presents the wake-up signal to the processor of the main controller. In response to the wake-up signal the main controller enters a wake-up mode, reads the at least one communication protocol configuration parameter from the data storage device, and implements the at least one communication protocol configuration parameter such that communication between the main controller and the communication protocol controller is established while maintaining a communication link between the communication protocol controller and a communication protocol enabled device.

Still further according to the present invention, a main controller for communicating with a communication protocol controller is provided. The main controller comprises a processor, a data storage device, a first bidirectional communication port electrically coupled to a communication protocol controller via a communication bus, and an input port. The input port is configured to receive a wake-up signal from a power management device. The main controller enters a wake-up mode in response to the wake-up signal and reads at least one communication protocol configuration parameter from the data storage device such that communication between the main controller and the communication protocol controller is established while communication between the communication protocol controller and a communication protocol enabled device is maintained.

BRIEF DESCRIPTION OF THE DRAWINGS

FIG. 1a is a diagram illustrating a communication system according to an example of the present invention;

FIG. 1b is a diagram illustrating a power management control circuit according to an example of the present invention;

FIG. 1c is a diagram illustrating an communication system according to an alternative example of the present invention;

FIG. 1d is a diagram illustrating a main controller according to an example of the present invention;

DETAILED DESCRIPTION OF THE PREFERRED EMBODIMENT(S)

Figure 2:
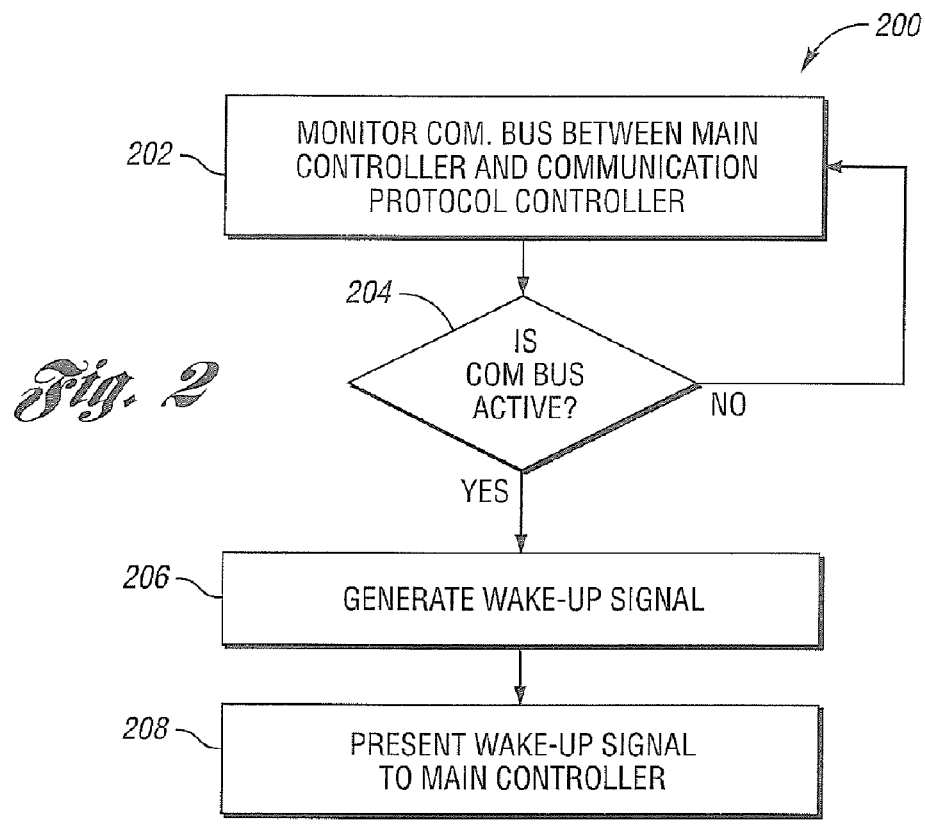
FIG. 2 is a diagram illustrating an example operation of a power management device of the present invention.

Referring to FIG. 1a, a diagram illustrating a communication system 100 of the present invention is shown. The communication system 100 generally comprises a communication protocol enabled device 102, a communication protocol controller 104, a power management controller 106, and a main controller 108.

The communication device 102 generally presents at least one signal that may wake up the main controller 108 while maintaining pre-existing communication links. The device 102 is generally electrically coupled to the communication protocol controller 104 via a communication link 118. In one example, the device 102 may be a Bluetooth enabled cellular telephone. In another example, the device 102 may be a Bluetooth enabled personal digital assistant (PDA). However, the device 102 may be implemented as any appropriate device capable of providing a communication link with the communication protocol controller 104 to meet the design criteria of a particular application.

The communication protocol controller 104 (e.g., Bluetooth controller, IEEE 802.11 controller, Universal Serial Bus (USB) controller, etc.) generally comprises a processor 138 (e.g., a microprocessor, an application specific processor, and the like), an IO port 120 that may receive a signal (E.G., a signal USER), and a second IO port 122 that may present a signal (e.g., a signal PCOM).

The protocol controller 104 may receive a user demand signal (e.g., the signal USER) generated by a user of the protocol enabled device 102 at the IO port 120 via the communication link 118. The communication link 118 is generally established by electrically coupling the device 102 to the IO port 120 (i.e., input port, output port, input and output port) of the protocol controller 104. In one embodiment, wireless components (e.g., radio frequency transmitters/receivers, infra-red transmitters/receivers, and the like) may be implemented to wirelessly electrically couple the device 102 to the IO port 120. In another embodiment, the electrical coupling between the device 102 and the controller 104 may be implemented via an interface device (not shown) such as a wire cable or a fiber optic cable. However, the electrical coupling between the device 102 and the controller 104 may be implemented via any appropriate signal communication to meet the design criteria of a particular application.

The signal USER is generally a control signal that may be presented when a user (not shown) desires to initiate at least one mode of operation of the main controller 108. In one example, the main controller 108 may be implemented as a Vehicle System Controller (VSC) and the signal USER may be generated to activate a vehicle ignition system (not shown). In another example, the signal USER may be generated to retrieve vehicle status information. In yet another example of the present invention, the signal USER may be generated to set (e.g., establish, change, modify, determine, etc.) vehicle parameter values. However, the signal USER may be any appropriate control, interrogation, polling, etc. signal to meet the design criteria of a particular application.

The processor 138 of the protocol controller 104 may be configured to generate at least one output communication signal (e.g., PCOM) in response to the signal USER. The output signal PCOM is generally presented to a data and control bus (i.e., a communication bus) 124 via the IO port 122. However, in an alternative embodiment, the signal PCOM may be presented to a dedicated communication link (not shown).

The power management controller (i.e., power management device) 106 may have an IO port 126 that may receive the signal PCOM, and an IO port 128 that may present a signal (e.g., a signal WAKE).

The controller 106 generally comprises a processor 140 (e.g., a microprocessor, an application specific processor, and the like) in electrical communication with (i.e., electrically coupled to) at least one computer-readable storage media (e.g., a memory 142) via at least one data and control bus 146. The computer-readable storage media 142 may include any of a number of memory devices such as read only memory (ROM), random access memory (RAM), and non-volatile (keep-alive) random access memory (NVRAM).

The computer-readable storage media 142 generally provide short-term and long-term storage of data used by the controller 106. The computer-readable storage media 142 may be implemented as any appropriate physical device capable of storing data representing instructions executable by the processor 140 to meet the design criteria of a particular application. Such memory devices may include PROM, EPROM, EEPROM, flash memory, and the like in addition to various magnetic, optical, and combination media capable of temporary and permanent data storage.

The computer-readable storage media 142 generally have program instructions (e.g., power management logic 144) stored thereon that may be executable by the controller 106. The program instructions may direct the controller 106 to monitor the communication bus 124 via the IO port 126, and determine when the communication protocol controller 104 is attempting communication with the main controller 108.

In addition, the program instructions may direct the controller 106 to generate a wake-up signal (e.g., the signal WAKE) in response to determining that the protocol controller 104 is generating a communication signal (e.g., the signal PCOM). That is, the power management controller 106 may generate and present the control signal WAKE in response to the control signal PCOM.

The program instructions may further direct the controller 106 to present the signal WAKE to the main controller 108 via the IO port 128. Additionally, the program instructions may direct the controller 106 to monitor the communication bus 124 and determine when the main controller 108 is in a low power mode (i.e., deep sleep mode, low power state, and the like) such that generation of the signal WAKE may be in response to a determination that the main controller 108 is in a low power mode when the signal PCOM is receieved.

The main controller 108 generally comprises a processor 150 (e.g., a microprocessor, an application specific processor, and the like), a memory 152, a data and control signal bus 154, a first IO port 130 that may receive/present a signal (e.g., the signal PCOM), and a second IO port 132 that may receive/present a signal (e.g., the signal WAKE), and a third IO port 134 that may receive/present a signal (e.g., a signal VCOM).

The processor 150 may be in electrical communication with (i.e., electrically coupled to) at least one computer-readable storage media (e.g., the memory 152) via the at least one data and control signal bus 154. The storage media 152 may include any of a number of devices such as read only memory (ROM), random access memory (RAM), and non-volatile (keep-alive) random access memory (NVRAM).

The storage media 152 generally provide short-term and long-term storage of data used by the controller 108. The storage media 152 may be implemented as any appropriate devices capable of storing data representing instructions executable by the processor 150 to meet the design criteria of a particular application. Such devices may include PROM, EPROM, EEPROM, flash memory, and the like in addition to various magnetic, optical, and combination media capable of temporary and permanent data storage.

The computer-readable storage media 152 generally have program instructions stored thereon that may be executable by the controller 108. The program instructions may direct the controller 108 to power down (i.e., enter a deep sleep mode, enter a low power mode, etc.) upon the occurrence of a predetermined event. In one example, the controller 108 may be in a vehicle and the predetermined event may correspond to the vehicle ignition (i.e., engine) being off.

In another example, the predetermined event may correspond to a predetermined period (i.e., duration, length of time, etc.) of inactivity on the communication bus 124. However, the predetermined event may correspond to any appropriate condition or state to satisfy the design criteria of a particular application. The power down sequence implemented by the main controller 108 generally includes the step of writing the present value of at least one communication protocol configuration parameter to the storage media 152.

A main controller 108 is generally in a low power mode (i.e., an initial low power mode) when power consumption of the controller 108 is insufficient to support communication between the controller 108 and the communication protocol controller 104. In one example, the main controller 108 may be in a low power mode when the IO port 130 is powered off. In another example, the main controller 108 may be in a low power mode when the operation of the processor 150 is generally limited to monitoring the IO port 132. However, any configuration of the main controller 108, wherein the configuration does not support communication between the controller 108 and the communication protocol controller 104, may be designated a low power mode of the main controller 108 to meet the design criteria of a particular application.

When the controller 108 is in a low power mode, the controller 108 generally monitors the IO port 132 to determine when the signal WAKE has been presented. When the port 132 receives the signal WAKE, the controller 108 may enter a wake-up mode (i.e., power up mode).

During the wake-up mode, the controller 108 generally reads and implements (i.e., executes, performs, operates in accordance with, etc.) the at least one protocol configuration parameter previously written to the storage media 152. Implementing the at least one previously stored configuration parameter generally eliminates initialization of and synchronization of the main controller 108 with the protocol controller 104 prior to the main controller 108 establishing communication with the protocol enabled device 102.

As discussed in the background, the initialization/synchronization process implemented in conventional approaches can cause a conventional protocol controller to drop previously established communication links with protocol enabled devices. Accordingly, eliminating the need to synchronize the protocol controller 104 with the main controller 108 of the present invention during the wake-up mode generally provides for the protocol controller 104 to maintain the previously established links to protocol enabled devices 102.

When the main processor 108 is in an operational mode (i.e., the wake-up mode is complete), the main processor 108 may operate in conformance with the user demand signals USER.

The main controller 108 is generally electrically coupled to a bus 136 via the third IO port 134. The controller 108 may communicate with additional systems and sub-systems (not shown) via the electrical coupling to the second communication bus 136. In one example, the bus 136 may be implemented as a Controller Area Network (CAN) in a vehicle. However, the bus 136 may be implemented as any appropriate type of communication bus (or wireless link) having any appropriate communications protocol, including any type of vehicle bus (e.g., SAE J1850 and J2366, etc.), to meet the design criteria of a particular application.

Referring to FIG. 1b, a diagram illustrating a power management control circuit 106' of the present invention is shown. The circuit 106' may be implemented similarly to the controller 106. The circuit 106' is generally implemented in place of the power management controller 106. As one skilled in the art would recognize, hardware based logic units may provide the operational characteristic (i.e., generating the wake-up signal WAKE, etc.) of the power management controller 106.

Referring to FIG. 1c, a diagram illustrating a communication system 100" of the present invention is shown. The system 100" may be implemented similarly to the system 100. The system 100" generally comprises a main controller 108" having a computer-readable storage media 152" including power management logic 144". In the system 100", the controller 108" generally determines when to enter the wake-up mode using the power management logic 144". Accordingly, the system 100" may be implemented without the power management controller 106, the IO port 126, the IO port 128, and the IO port 132.

Referring to FIG. 1d, a diagram illustrating a main controller 108''' of the present invention is shown. The controller 108''' may be implemented similarly to the controller 108. The controller 108''' generally comprises a power management logic circuit 106'''. The integrated power management logic circuit 106''' generally determines when the processor 150 enters the wake-up mode. Accordingly, the controller 108''' may be implemented without the IO port 132. Similarly, the controller 108''' may be implemented in a system without a separate power management controller (e.g., the controller 106 of system 100) and without a separate power management logic circuit (e.g., the circuit 106' shown in FIG. 1b).

Referring to FIG. 2, a diagram illustrating an operation (i.e., method, process, procedure, routine, steps, blocks, algorithm, etc.) 200 of the power management device (e.g., the device 106, the device 106') according to one example of the present invention is shown. The method 200 may be advantageously implemented in connection with system embodiments (e.g., the system 100, the system 100", etc.) of the present invention.

A power management device (e.g., power management controller 106, the power management logic circuit 106', the power management logic 106''', and the like) generally monitors a communication bus that is generally between (e.g., that electrically couples) a main controller and a communication protocol controller (e.g., the communication bus 124 between the main controller 108 and the communication protocol controller 104) (step or block 202). The power management device generally determines when the communication protocol controller is attempting to communicate with the main controller (decision step or block 204).

When the power management device determines that the communication protocol controller is attempting to communicate with the main controller (the YES leg of the decision block 204), the device generates a wake-up signal (step or block 206). The power management device presents the wake-up signal to the main controller (step or block 208).

Returning to the decision block 204, when protocol controller activity is not detected (the NO leg of the decision block 204) the power management device continues to monitor the communication bus (step or block 202).

Figure 3:
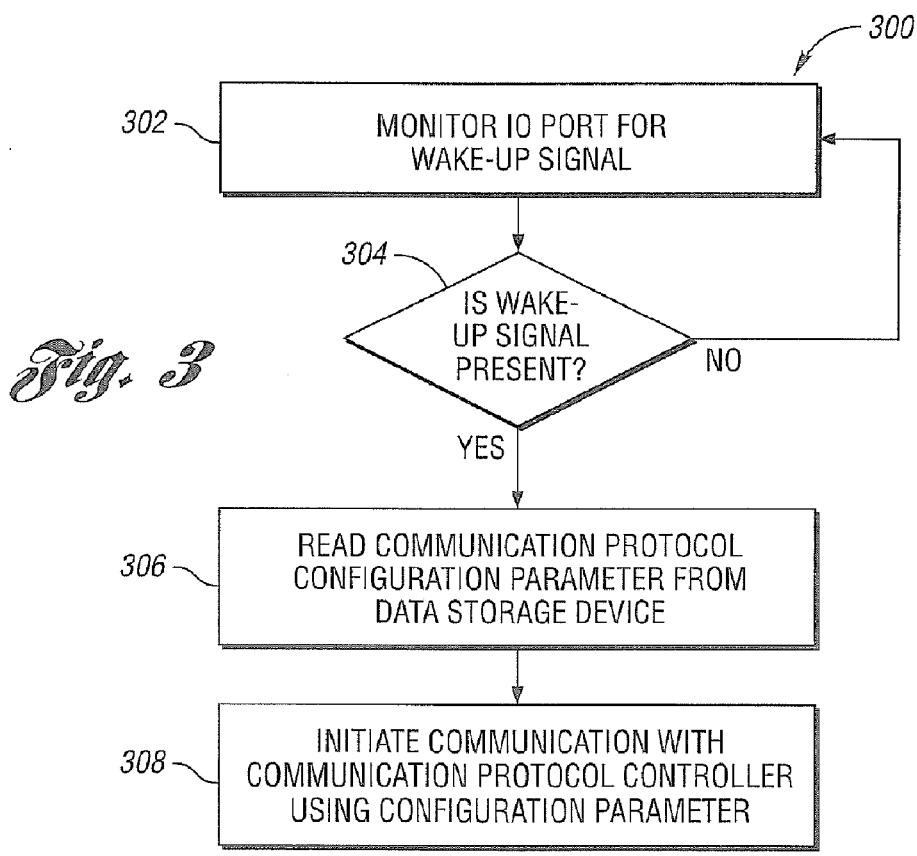
FIG. 3 is a diagram illustrating an example operation of a main controller of the present invention.

Referring to FIG. 3, a diagram illustrating an operation 300 of the main controller 108 according to one embodiment of the present invention is shown. The method 300 may be advantageously implemented in connection with system embodiments (e.g., the system 100, the system 100", etc.) of the present invention.

A main controller (e.g., the controller 108) generally monitors an IO port (e.g., the IO port 132) (step or block 302) and generally determines when a wake-up signal is present at the monitored IO port (decision step or block 304). When the main controller detects the presence of a wake-up signal at the IO port (the YES leg of the decision block 304), the main controller reads at least one communication protocol configuration parameter from a data storage device (e.g., the memory 152) (step or block 306).

The main controller generally uses the communication protocol configuration parameter to initiate communication with a communication protocol controller (e.g., the controller 104) such that communication between the communication protocol controller and a communication protocol enabled device (e.g., the device 102) is maintained (step or block 308).

Returning to the decision block 304, when a wake-up signal has not been detected (the NO leg of the decision block 304) the main controller continues to monitor the IO port (step or block 302).

As is readily apparent from the foregoing description, then, the present invention generally provides an improved apparatus (e.g., the systems 100 and 100") and an improved method (e.g., the methods 200 and 300) for initiating communication between a main controller (e.g., the controller 108) and a communication protocol controller (e.g., the controller 104). The improved system and method of the present invention may allow communication between a main controller and a communication protocol controller to be initiated such that the communication protocol controller maintains pre-existing communication links with communication protocol enabled devices.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for establishing communication between a communication protocol controller and a main controller, the method comprising:

monitoring a communication bus using a power management device wherein the communication bus is electrically coupled to a communication protocol controller, the power management device, and a main controller residing in an initial low power mode and having a processor and a data storage device;

determining when the communication protocol controller is attempting to communicate with the main controller;

generating a wake-up signal in response to the attempted communication;

presenting the wake-up signal to the processor of the main controller, wherein the main controller enters a wake-up mode in response to the wake-up signal;

reading at least one communication protocol configuration parameter from the data storage device, wherein the at least one configuration parameter is read by the main controller in response to the wake-up signal; and initiating communication between the main controller and the communication protocol controller using the at least one communication protocol configuration parameter such that communication between the communication protocol controller and a communication protocol enabled device is maintained.

2. The method of claim 1 wherein the wake-up signal is generated in response to the attempted communication only when the main controller is in a low power mode.

3. The method of claim 1 further comprising the step of writing at least one communication protocol configuration parameter to the data storage device when the main controller enters a low power mode.

4. The method of claim 1 wherein the communication protocol controller is a Bluetooth controller.

5. The method of claim 1 wherein the main controller is a Vehicle System Controller.

6. The method of claim 1 wherein the main controller is implemented in connection with a vehicle and is electrically coupled to a vehicle bus.

7. The method of claim 6 wherein the vehicle bus is a Controller Area Network.

8. A system for establishing communication between a communication protocol controller and a main controller, the system comprising:

a communication protocol controller electrically coupled to a communication bus;

a main controller electrically coupled to the communication bus and having a processor and a data storage device including at least one communication protocol configuration parameter, wherein the main controller is in an initial low power mode; and a power management device electrically coupled to the communication bus, wherein the power management device monitors the communication bus, determines when the communication protocol controller is attempting communication with the main controller, generates a wake-up signal in response to the attempted communication, and presents the wake-up signal to the processor of the main controller, and in response to the wake-up signal the main controller enters a wake-up mode, reads the at least one communication protocol configuration parameter from the data storage device, and implements the at least one communication protocol configuration parameter such that communication between the main controller and the communication protocol controller is established while maintaining a communication link between the communication protocol controller and a communication protocol enabled device.

9. The system of claim 8 wherein the power management device generates the wake-up signal in response to the attempted communication only when the main controller is in a low power mode.

10. The system of claim 8 wherein the main controller writes at least one Communication protocol configuration parameter to the data storage device when the main controller enters a low power mode.

11. The system of claim 8 wherein the communication protocol controller is a Bluetooth controller.

12. The system of claim 8 wherein the main controller is a Vehicle System Controller.

13. The system of claim 8 wherein the main controller is implemented in connection with a vehicle and is electrically coupled to a vehicle bus.

14. The system of claim 13 wherein the vehicle bus is a Controller Area Network.

15. A main controller for communicating with a communication protocol controller, the main controller comprising:
   a processor;
   a data storage device;
   a first bidirectional communication port electrically coupled to a communication protocol controller via a communication bus; and
   an input port configured to receive a wake-up signal from a power management device, wherein the main controller enters a wake-up mode in response to the wake-up signal and reads at least one communication protocol configuration parameter from the data storage device such that communication between the main controller and the communication protocol controller is established while communication between the communication protocol controller and a communication protocol enabled device is maintained.

16. The main controller of claim 15 wherein the processor writes at least one communication protocol configuration parameter to the data storage device when the main controller enters a low power mode.

17. The main controller of claim 15 wherein the communication protocol controller is a Bluetooth controller.

18. The main controller of claim 15 wherein the main controller is a Vehicle System Controller.

19. The main controller of claim 15 further comprising a second bidirectional communication port electrically coupled to a vehicle bus.

20. The main controller of claim 19 wherein the vehicle bus is a Controller Area Network.

* * * * *